No. 651,323. Patented June 5, 1900.
T. B. DOOLEY.
MOTOR VEHICLE.
(Application filed Jan. 19, 1900.)
(No Model.) 3 Sheets—Sheet 1.
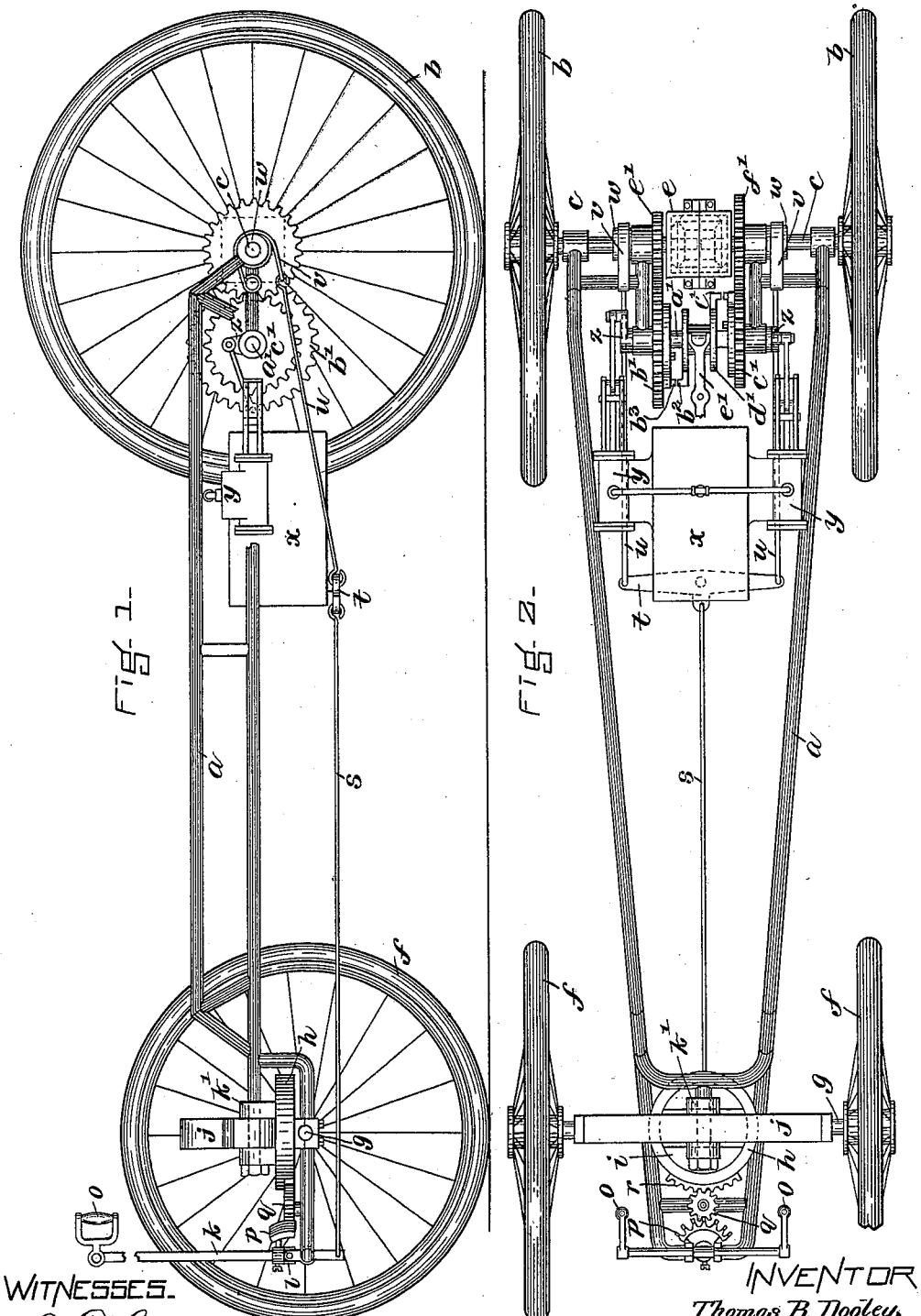
WITNESSES.
A. D. Grover.
Roy K. Hill.
INVENTOR.
Thomas B. Dooley.
by Crossley & Davis.
his Atty's.

No. 651,323.
Patented June 5, 1900.
T. B. DOOLEY.
MOTOR VEHICLE.
(Application filed Jan. 19, 1900.)
(No Model.)
3 Sheets—Sheet 2.
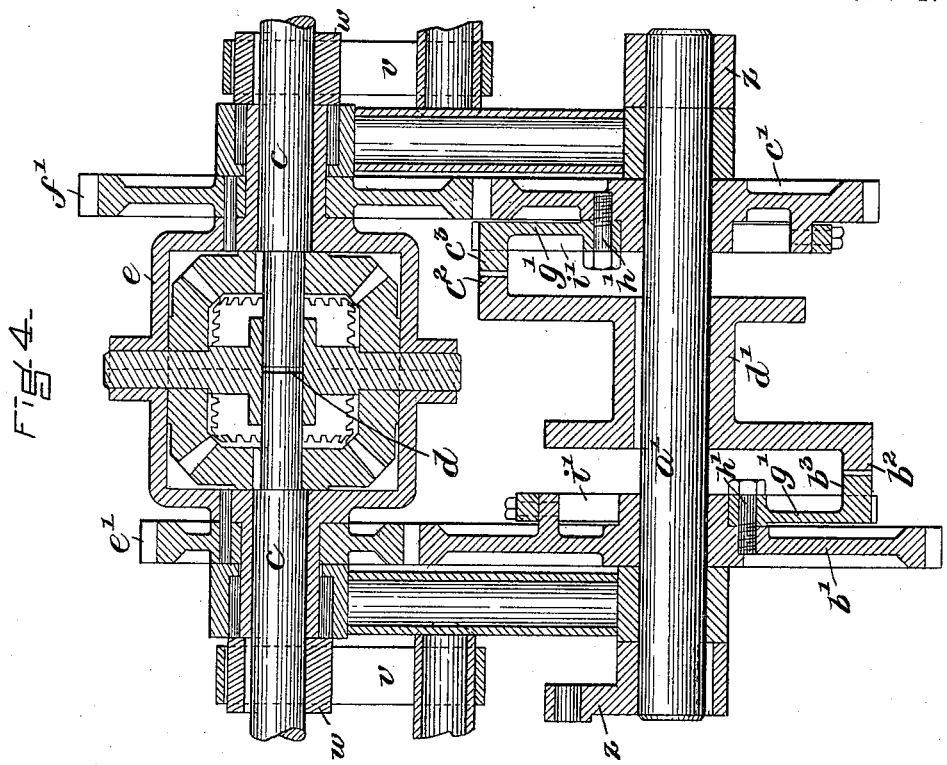
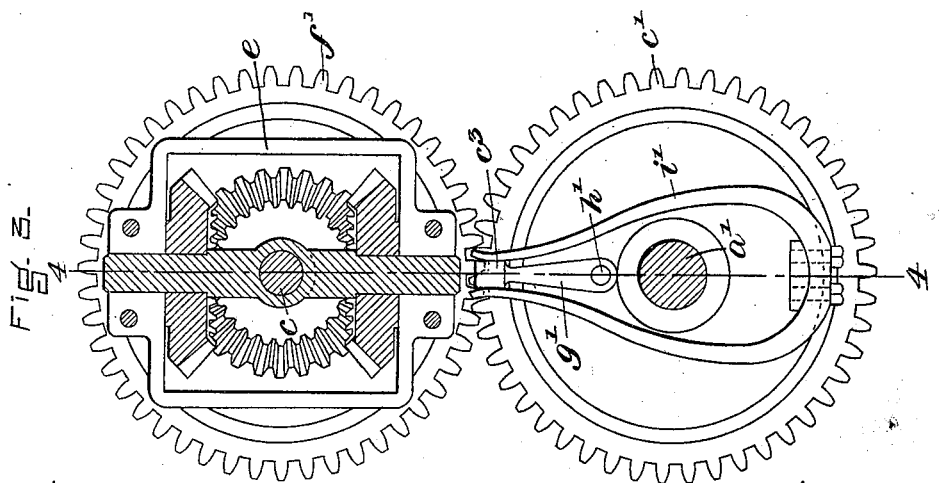
WITNESSES
A. D. Grover
Roy N. Hill
INVENTOR
Thomas B. Dooley.
by Crossley & Davis
his Atty's.

No. 651,323. Patented June 5, 1900.
T. B. DOOLEY.
MOTOR VEHICLE.
(Application filed Jan. 19, 1900.)
(No Model.) 3 Sheets—Sheet 3.
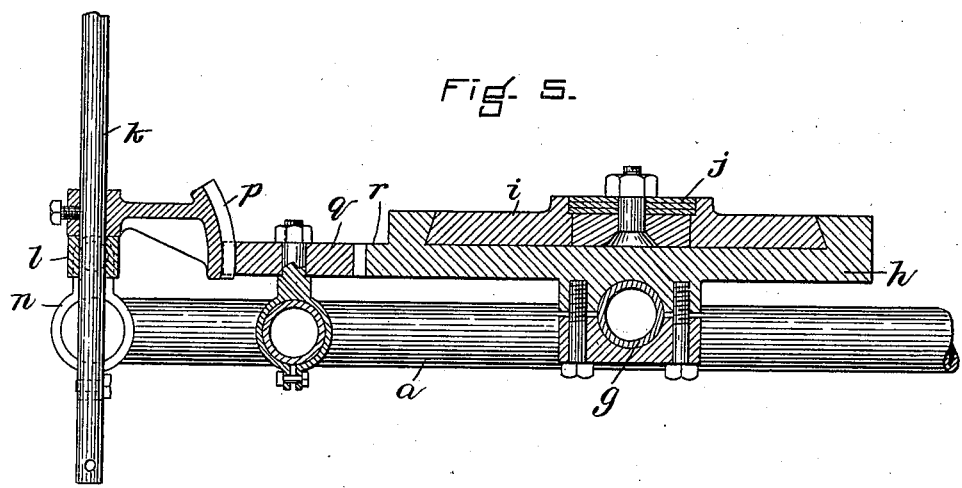
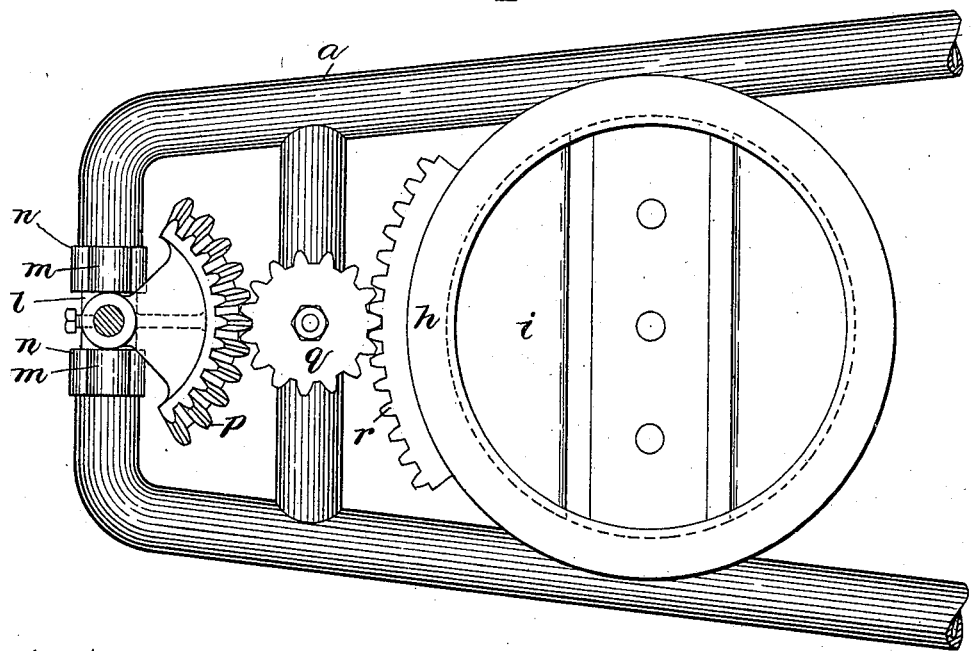
WITNESSES
A. D. Grover.
Roy K. Hill.
INVENTOR
Thomas B. Dooley.
by Crossley & Davis.
his Atty's.

UNITED STATES PATENT OFFICE.

THOMAS B. DOOLEY, OF MALDEN, MASSACHUSETTS, ASSIGNOR TO EVERETT D. WIGGIN, TRUSTEE, OF BOSTON, MASSACHUSETTS.

MOTOR-VEHICLE.

SPECIFICATION forming part of Letters Patent No. 651,323, dated June 5, 1900.

Application filed January 19, 1900. Serial No. 2,010. (No model.)

*To all whom it may concern:*

Be it known that I, THOMAS B. DOOLEY, of Malden, in the county of Middlesex and State of Massachusetts, have invented certain new and useful Improvements in Motor-Vehicles, of which the following is a description sufficiently full, clear, and exact to enable those skilled in the art to which it appertains or with which it is most nearly connected to make and use the same.

This invention has reference generally to vehicles propelled by motive power emanating from engines or means carried by the vehicles themselves.

It is one object of the invention to provide means for steering or guiding the vehicle which shall be easy and natural of operation and at the same time most efficient in the accomplishment of the result sought to be effected.

It is a further object of the invention to provide an improved brake for vehicles of the kind mentioned which shall possess all of the virtues mentioned in connection with the steering means and be of particular utility in the hands of one not highly skilled in controlling motor-vehicles or one who may become excited or in a degree panic-stricken in case of emergency.

It is a further object of the invention to provide an efficient and readily-operated speed-changing mechanism, avoiding jar or shock in the use of the means and securing other advantages.

It is also an object of the invention to provide other improvements incidental to the foregoing, as will more fully appear hereinafter.

The invention is exemplified in the annexed drawings, forming a part of this specification, and in which like letters of reference designate like parts or features, as the case may be, wherever they occur.

Of the drawings, Figure 1 is a side elevation of a motor-carriage frame and running-gears equipped with my improvements, some of the parts being represented as broken away. Fig. 2 is a substantial plan view of the same. Fig. 3 is an enlarged sectional view through a part of the equalizing mechanism and its adjuncts, showing particularly the means for preventing shock or jar in the engagement of the clutch device with one of the driving-gears. Fig. 4 is a horizontal sectional view taken on the line 4 4 of Fig. 3, showing the clutch and equalizing mechanisms and some of their adjuncts. Fig. 5 is a vertical central sectional view through the front portion of the frame and gearing, showing particularly the means which embody the part of the invention relating to steering and braking the vehicle. Fig. 6 is a sectional plan view of the means shown in Fig. 5.

In the drawings, $a$ designates the frame of the vehicle, which frame may be of any desired form and be composed, if desired, of light metallic tubing, as shown.

$b\ b$ designate the rear wheels, secured to and turning with the driven axle $c$, divided, as at $d$, in the box $e$, containing the equalizing mechanism.

$f\ f$ designate the front wheels, which turn on spindles on the end of the front axle $g$. The front axle at a point centrally between the ends has the bed-plate $h$ secured to it, which bed-plate in its upper side is provided with a circular dovetail recess in which is set the circular bevel-edged bolster-plate $i$, to which the carriage-body spring $j$ at the front may be secured and to which the front part of the vehicle-body is attached, so as to connect the body with the fore gearing.

The bolster-plate serves that function of the ordinary vehicle king-bolt in virtue of which the front axle may be oscillated, so that the vehicle may be turned to the right or the left. It may, moreover, be explained that the bolster-plate is constructed somewhat on the principle of a lewis—that is, in three parts—the central part forming a key to the structure, so that it can be put into and taken out of place in the undercut or dovetailed recess in the bed-plate.

$k$ designates the steering and brake shaft, which has a bearing, so that it may turn axially in a collar $l$, from the opposite sides of which in a horizontal direction extend trunnions $m$, that are fitted in bearings formed on clips $n$, clamped upon parts of the frame $a$.

Under the construction mentioned it will be understood that by the manipulation of the handles $o$ on the upper end of the shaft $k$ the latter may be oscillated axially in the collar $l$ and vibrated or rocked transversely on the trunnions $m$.

To the shaft $k$ at a proper point is secured a spherosegmental gear $p$—i. e., a gear having the form of a segment of a sphere—with the teeth on the outer surface. The said gear $p$ engages an idler-gear $q$, journaled on a stud in the frame, which idler in turn engages a toothed segment $r$, secured to the periphery of the bed-plate $h$. With this construction by the axial oscillation of the shaft $k$, as described, the front axle $g$ will be oscillated in the same direction, so as to change the course of the carriage to the right or the left or keep its movement on a straight line.

The shaft $k$ is extended quite an appreciable distance below its bearing-collar $l$, and to its lower end is connected the front end of a brake-rod $s$, which at its rear end is attached to the brake-bar $t$, having rods $u$ at its opposite ends connected with the brake-straps $v$ of the brakes $w$, one on each divided part of the rear axle. It will now be seen that the person on the vehicle, having hold of the handles $o$ of the brake and steering rod, may not only guide the course of the vehicle, as before explained, but by drawing upon the said handles, as he would be inclined to do to stop the carriage, he will rock the shaft $k$ upon its trunnions $m$ and apply the brakes to the driving-axle and "slow down" the speed of the vehicle or bring it to a stop. The form of the spherosegmental gear is such that however the shaft $k$ may be moved the said gear will keep in proper mesh with the idler $q$. This mode of operation of the steering and speed-controlling means of the vehicle is deemed of special importance in the invention, since it is similar to that a driver of a horse would exercise and similar to that a person would instinctively employ under any circumstances, rendering training to the use of the means unnecessary or at the most easy. The motor in this case forming no part of the present invention, is represented by little more than conventional lines, in which $x$ may designate a steam-boiler supplying steam to the steam-chests $y$, so that the cranks $z$ may turn the crank-shaft $a'$ through connection with proper pitmen, piston-rods, and pistons, as will be understood without further description.

Arranged upon the crank-shaft $a'$ so as to normally turn loosely thereon are two gear-wheels $b'$ $c'$, and splined on the crank-shaft, between the said gears, is a clutch $d'$, provided on opposite sides with clutching-lugs $b^2$ and $c^2$. The said clutch may be moved by a suitable forked lever $e''$ to a central position between the said gear-wheels, so as to be kept clear of both, or it may be moved so that the lug $b^2$ may be brought into engagement with the clutch-lug $b^3$ on the wheel $b'$ or so that the lug $c^2$ may engage the clutch-lug $c^3$ on the wheel $c'$. Whichever wheel $b'$ or $c'$ is engaged by the clutch $d'$ becomes the driving-wheel, as will be understood.

The gear $b'$ meshes with the gear $e'$, of smaller diameter, fast on one part of the divided axle $c$, while the gear $c'$ meshes with a gear $f'$, larger in diameter than itself, fast on the other part of the divided axle $c$, so that if the clutch is moved to make the gear $b'$ the driving-gear the vehicle may be run at a high rate of speed at the expense of power, as when little power is required, while when the clutch is moved into engagement with the gear $c'$, so as to make the latter the driving-gear, the vehicle will be run at a slower rate of speed, though employing, as it were, greater power when needed, as in "uphill" work.

The two parts of the driving-axle $c$ are connected by an equalizing mechanism consisting of the system of bevel-gearing inclosed within the box $e$, with which the gears $e'$ and $f'$ are connected. In view of the state of the art the construction and mode of operation of the equalizing mechanism will be clearly understood in view of what is illustrated in Figs. 3 and 4.

In order to engage the clutch-lugs $b^2$ and $c^2$ with the lugs $b^3$ and $c^3$ without shock or jar and so as to prevent breakage of parts, I form each of the lugs $b^3 c^3$ on the end of an arm $g'$, which is pivoted at its inner end, as at $h'$, on the clutch-gear (see Fig. 3) and connect a strong spring $i'$ with the said gear, so as to bear upon both sides of the lug and hold it in normal position. Under these conditions when the lugs of the clutch member $d'$ are brought into engagement with the lugs of the clutch-gear the latter lugs will be allowed to yield slightly against the tension of the spring $i'$, so as to avoid shock and breakage and still make the connection relatively quick.

In order to enable the motor-carrying portion of the carriage-body to be held or maintained in level position, though the front wheels should stand on uneven ground, so as to incline the front axle, I have swiveled the forward part of the frame to the rear of the bolster-plate in the bolster or bearing on the bolster-plate, as indicated at $k'$. This enables me, as I have before said, to run the forward wheels upon inclined ground or surfaces without disturbing the level position of the motor and main portion of the carriage-body.

The invention as a whole is contrived with a view to make its operation and control most natural and easy and certain in all of its parts, and while a good form of means is shown in which the invention may be embodied this may be varied in form and arrangement without departing from the nature or spirit of the invention.

Having thus explained the nature of the invention and described a way of constructing and using the same, though without attempting to set forth all of the forms in which it may be made or all of the modes of its use, it is declared that what is claimed is—

1. In a motor-vehicle, the combination of an upstanding steering shaft or stem journaled in a rocking bearing, whereby the said shaft or stem may be both oscillated and vibrated to and fro; braking mechanism connected with the shaft so as to be operated by the same acting as a lever; and rotative connections between said shaft and the steering members of the running-gear of the vehicle, said connections being in the form of intermeshing gears, substantially as described.

2. In a motor-vehicle, the combination with a swiveled front-axle support having a gear; an upstanding shaft or stem journaled in a rocking bearing and carrying a spherosegmental gear; an idler connecting the latter with the first-named gear; and brake mechanism connected with the shaft or stem so as to be applied by the lever action thereof, substantially as described.

3. The combination, of the oscillatory and vibratory brake and steering shaft, brake devices and means connecting the same with the shaft, with the oscillatory front axle, a spherosegmental gear connected with the shaft, and means connecting the said spherosegmental gear with the front axle.

4. In a motor-vehicle the combination, with the divided axle, a driven crank-shaft, an equalizing mechanism connecting the two parts of the divided axle, means between the crank-shaft and one part of the divided axle for running the axle at a high rate of speed, means between the crank-shaft and the other part of the axle for running the axle at a slower rate of speed, and a positively-engaging cushioned clutch mechanism on the crank-shaft for connecting the latter with either of said means.

5. In a clutch mechanism for differential speed-gearing for motor-vehicles, the combination with a shaft and gears loosely mounted thereon; of a clutch-block splined on the shaft between the gears and having lateral projections, clutch-pieces movably mounted on the gears for engagement with said lateral projections respectively, and springs holding said clutch-pieces normally in a central position, substantially as described.

6. A clutch-gear provided with a clutch, a short arm pivoted at one end to the gear and provided at the other end with a clutch-lug, combined with a strong spring connected with the gear engaging the lever to hold the lug in normal position.

7. A clutch-gear provided with a clutch, a short arm pivoted at one end to the gear and provided at the other end with a clutch-lug, combined with a strong spring connected with the gear engaging the lever to hold the lug in normal position and an adjustable clutch device adapted to be moved into and out of engagement with the said lug.

In testimony whereof I have signed my name to this specification, in the presence of two subscribing witnesses, this 7th day of October, A. D. 1899.

THOS. B. DOOLEY.

Witnesses:
ARTHUR W. CROSSLEY,
WILLIAM S. TYLER.